United States Patent
Liu et al.

(10) Patent No.: US 11,356,504 B2
(45) Date of Patent: *Jun. 7, 2022

(54) METHODS AND SYSTEMS FOR ORCHESTRATING DISTRIBUTED COMPUTING RESOURCES

(71) Applicant: Verizon Patent and Licensing Inc., Basking Ridge, NJ (US)

(72) Inventors: Weimin Liu, Chatham, NJ (US); Yuk Lun Li, Morganville, NJ (US); Indraneel Sen, Livingston, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/118,190

(22) Filed: Dec. 10, 2020

(65) Prior Publication Data
US 2021/0099515 A1 Apr. 1, 2021

Related U.S. Application Data

(63) Continuation of application No. 16/528,516, filed on Jul. 31, 2019, now Pat. No. 10,893,097.

(51) Int. Cl.
*H04L 67/101* (2022.01)
*G06F 11/34* (2006.01)
*H04L 67/1008* (2022.01)

(52) U.S. Cl.
CPC ........ *H04L 67/101* (2013.01); *G06F 11/3466* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 2014/0301245 A1* | 10/2014 | Rose | H04W 72/085 370/255 |
| 2017/0257432 A1* | 9/2017 | Fu | H04L 67/2823 |
| 2017/0272485 A1* | 9/2017 | Gordon | H04L 65/601 |
| 2019/0149599 A1* | 5/2019 | Bartfai-Walcott | H04L 67/125 709/226 |
| 2020/0004582 A1 | 1/2020 | Fornash et al. | |
| 2020/0267210 A1 | 8/2020 | Chatt et al. | |
| 2020/0267212 A1 | 8/2020 | Chatt et al. | |
| 2021/0124624 A1* | 4/2021 | Jeong | G06F 9/5044 |

* cited by examiner

*Primary Examiner* — Jeffrey R Swearingen

(57) ABSTRACT

An illustrative orchestration system is configured to provide, to a user equipment (UE) device communicatively coupled to a federation of compute clusters, cluster selection data for a subset of compute clusters from the federation of compute clusters. The cluster selection data is configured to facilitate the UE device in characterizing the compute clusters of the subset with respect to a service optimization policy. The orchestration system is further configured to receive, from the UE device, an orchestration request indicative of a compute cluster selected by the UE device based on the characterizing of the compute clusters of the subset. The orchestration system is configured to then orchestrate, in response to the orchestration request, fulfillment of a service request to be performed by the selected compute cluster for the UE device. Corresponding methods, systems, and devices are also disclosed.

20 Claims, 12 Drawing Sheets

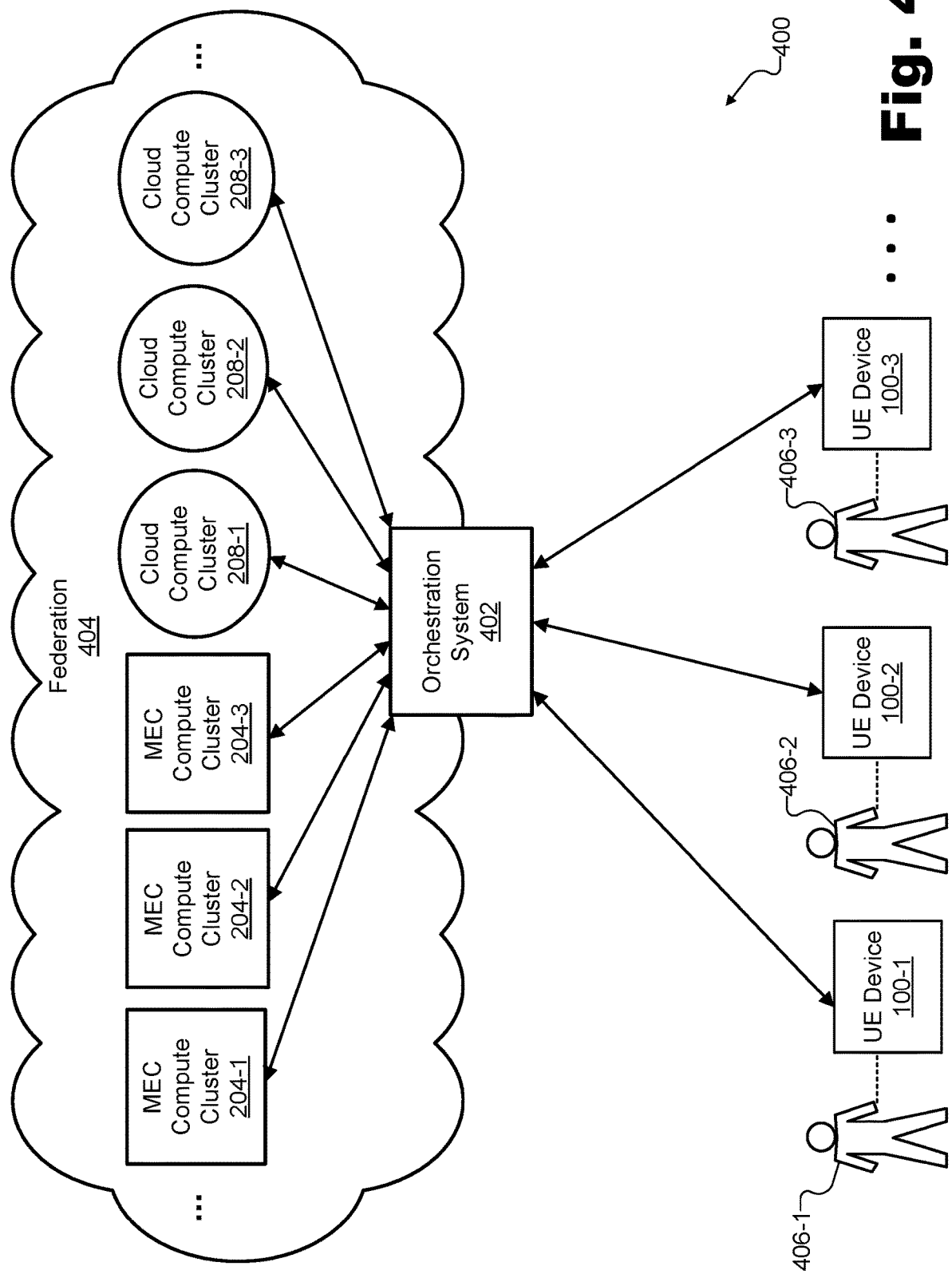

Cluster Selection Data
600

| Resource Combination | Resources | | | Compute Cluster | | |
|---|---|---|---|---|---|---|
| | # CPUs | Memory | #GPUs | MEC-1<br>192.168.1.100 | MEC-2<br>192.168.1.200 | Cloud-1<br>23.45.67.89 |
| small-none | 2 | 8 GB | None | $0.60 | $0.30 | $0.10 |
| medium-none | 4 | 16 GB | None | $1.20 | $0.60 | $0.20 |
| large-none | 8 | 32 GB | None | $2.40 | $1.20 | $0.40 |
| small-small | 2 | 8 GB | 256 | $1.20 | $0.60 | $0.20 |
| medium-small | 4 | 16 GB | 256 | $2.40 | $1.20 | $0.40 |
| large-small | 8 | 32 GB | 256 | $4.80 | $2.40 | $0.80 |
| small-large | 2 | 8 GB | 4096 | $2.40 | $1.20 | $0.40 |
| medium-large | 4 | 16 GB | 4096 | $4.80 | $2.40 | $0.80 |
| large-large | 8 | 32 GB | 4096 | $9.60 | $4.80 | $1.60 |

Fig. 6

Transport Latency Data
702

| Transport Latency | Compute Cluster | | |
|---|---|---|---|
| | MEC-1 | MEC-2 | Cloud-1 |
| | 5 ms | 9 ms | 47 ms |

Fig. 7A

Compute Latency Data
704

| Resource Combination | Resources | | | Estimated Compute Latency |
|---|---|---|---|---|
| | # CPUs | Memory | #GPUs | |
| small-none | 2 | 8 GB | None | 10 ms |
| medium-small | 4 | 16 GB | 256 | 6 ms |
| large-large | 8 | 32 GB | 4096 | 3 ms |

Fig. 7B

Characterization Data
800

| Resource Combination | Cluster |||||| 
| | MEC-1 || MEC-2 || Cloud-1 ||
| | Latency | Efficiency | Latency | Efficiency | Latency | Efficiency |
| small-none | 15 ms | $0.60 | 19 ms | $0.30 | 57 ms | $0.10 |
| medium-small | 11 ms | $2.40 | 15 ms | $1.20 | 53 ms | $0.40 |
| large-large | 8 ms | $9.60 | 12 ms | $4.80 | 50 ms | $1.60 |

Fig. 8

METHODS AND SYSTEMS FOR ORCHESTRATING DISTRIBUTED COMPUTING RESOURCES

RELATED APPLICATIONS

This application is a continuation application of U.S. patent application Ser. No. 16/528,516, filed Jul. 31, 2019, and entitled "Methods and Devices for Discovering and Employing Distributed Computing Resources to Balance Performance Priorities," which is hereby incorporated by reference in its entirety.

BACKGROUND INFORMATION

The popularity of mobile devices and networked computing has grown immensely in recent years. As a result, large communication networks (e.g., national cellular networks providing wireless phone and data communication services) continue to develop and to provide network and communication services to millions of user equipment ("UE") devices such as mobile devices, Internet of Things ("IoT") devices, and various other types of computing devices.

To help UE devices perform computing tasks efficiently and effectively, distributed computing architectures have been deployed that allow UE devices to distribute certain computing tasks to networked computing resources that may be able to perform the computing tasks more efficiently and/or effectively than the UE device can perform the tasks itself. While distributed computing architectures have proven to be of great value for many users employing them for various applications, however, each user and/or application may have its own performance priorities for distributed computing tasks. These performance priorities may not be achievable by the distributed computing architectures that have been deployed.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4 illustrates an exemplary configuration within which exemplary implementations of the UE device of FIG. 1 may operate according to embodiments described herein.

FIG. 6 illustrates exemplary cluster selection data according to embodiments described herein.

FIGS. 7A and 7B illustrate exemplary latency data according to embodiments described herein.

FIG. 8 illustrates exemplary characterization data according to embodiments described herein.

DETAILED DESCRIPTION OF PREFERRED EMBODIMENTS

Figure 1:
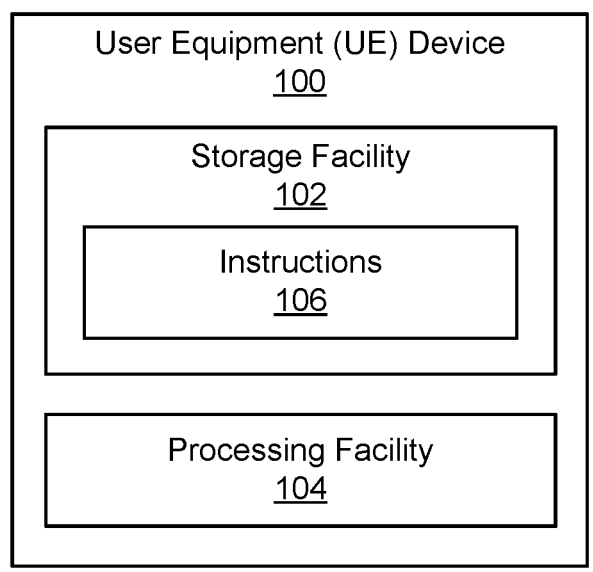
FIG. 1 illustrates an exemplary user equipment ("UE") device for discovering and employing distributed computing resources to balance performance priorities according to embodiments described herein.

Methods and devices for discovering and employing distributed computing resources to balance performance priorities are described herein. For example, the methods and devices described herein may allow distributed computing resources to be discovered and employed in a manner that helps customize the balancing of performance priorities (e.g., latency performance, resource efficiencies, etc.) in accordance with user preferences that may be manifested in various ways.

Applications executing on various types of user equipment ("UE") devices (e.g., mobile devices, Internet of Things ("IoT") devices, or other computing devices served by a provider network) require computing power and data storage to function properly. While some such computing resources may be available on the UE device itself, significant advantages may arise when at least some computing tasks are be performed by distributed computing resources that are more powerful, plentiful, or parallelized than those computing resources that are available on the UE device itself. For instance, it may be desirable for certain computing tasks to be outsourced from the UE device to distributed resources such as Multi-access Edge Compute ("MEC")-based computing resources, cloud-based computing resources, or a combination thereof. While various options for such distributed resources may be available to a given UE device for a particular computing task that is to be performed, however, the consequences to the UE device and/or the application executing thereon may be different depending on which option is selected. For example, the computing resources selected to fulfill a service request (i.e., perform one or more distributed computing tasks) for a particular UE device may have a substantial impact on user experience, total costs (e.g., to the user and/or to the network provider), battery life and/or power consumption of the UE device, and so forth.

Accordingly, methods and devices described herein provide discovery and orchestration mechanisms for distributed computing resources to be selected to provide each user and/or application an ability to optimize for user experience, cost, battery life, and so forth. In this way, mobile network operators (e.g., entities that provide and control any of the provider networks described herein) may be enabled to offer a wide range of network services in a manner that maximizes the quality of service of the provider networks.

To this end, and as will be described in more detail below, a UE device may be configured to perform various operations for discovering and employing distributed computing resources to balance performance priorities. For example, the UE device may provide a service request to an orchestration system associated with a federation of compute clusters (e.g., distributed computing servers, sites, or other entities offering computing resources to fulfill distributed computing service requests) that are communicatively coupled with the UE device and available to fulfill the service request. The UE device may also identify a service optimization policy for the service request, such as a service optimization policy that is associated with (e.g., indicative of, representative of) a user preference for balancing a plurality of performance priorities in a particular way during fulfillment of the service request. For example, the service optimization policy may indicate how a particular service request is to balance, for example, latency considerations (e.g., which may have a significant impact on user experience) with resource efficiency considerations (e.g., which may have a significant impact on costs the user will bear).

In response to providing the service request, the UE device may receive cluster selection data from the orchestration system. For instance, the cluster selection data may be representative of a subset of compute clusters from the federation of compute clusters. Based on the cluster selection data, the UE device may characterize each of the compute clusters in the subset with respect to the plurality of performance priorities. As such, the UE device may select, based on the identified service optimization policy and based on the characterization of each of the compute clusters in the subset, a compute cluster from the subset to fulfill the service request. Upon making this selection, the UE device may provide an orchestration request to the orchestration system. For instance, the orchestration request may be indicative of the selected compute cluster and may serve to request that the orchestration system orchestrate the fulfillment of the service request by the selected compute cluster.

It will be understood that the operations described above may be performed in any suitable sequence and/or may be performed concurrently or in parallel with one another as may serve a particular implementation.

Methods and devices described herein for discovering and employing distributed computing resources to balance performance priorities may provide various benefits and advantages. As one exemplary benefit, end users of UE devices that are configured to balance performance priorities in the ways described herein may benefit as a result of performance priorities of each user (and/or application being executed by each user) being accounted for and met.

As one example, a video game player who desires to maximize his or her performance at a particular mobile game application will be considered. The player may desire to minimize the latency he or she experiences during gameplay regardless of how inefficient that may be in terms of efficiency tradeoffs of using particular computing resources, bandwidth considerations, battery life, monetary costs, and so forth. In contrast, a more casual player of the same game application may be less concerned about the latency he or she experiences, while placing more importance on efficiency concerns such as cost and battery life. While each of these end users may be operating the same mobile game application, they may have different goals that would be best served by different distributed computing resources. Specifically, for example, the more dedicated player may be willing to bear the costs of using a MEC compute cluster that is nearby and can provide latency that is so small as to be negligible or unperceivable by the user. Meanwhile, the more casual gamer may be willing to endure some degree of noticeable lag (caused by higher latency) associated with using a cloud compute cluster that is relatively remote from the user's location if it will result in a more efficient gaming experience. Accordingly, both of these exemplary end users will benefit in terms of user experience (i.e., game performance in relation to cost and/or battery life, in this example) from methods and devices that appropriately and dynamically account for the different performance priorities that the users have.

As another exemplary benefit, mobile network operators that provide, maintain, and/or otherwise control provider networks (e.g., wireless communication networks such as cellular and mobile data networks, etc.) may benefit from being able to provide superior and flexible service to customers. Accounting for individualized performance priority tradeoffs for users and applications may enable mobile network operators to provide attractive services to customers and potential customers, thereby increasing customer loyalty, attracting new accounts, and/or otherwise strengthening the position of the mobile network operators in the marketplace.

Various embodiments will now be described in more detail with reference to the figures. The disclosed methods and devices may provide one or more of the benefits mentioned above and/or various additional and/or alternative benefits that will be made apparent herein.

FIG. 1 illustrates an exemplary UE device 100 for discovering and employing distributed computing resources to balance performance priorities. UE device 100 may be implemented as (or included within) any suitable computing device or system as may be employed or used by a consumer or enterprise user for performing any of the use cases or applications described herein. For example, UE device 100 may be implemented as a mobile device (e.g., a smartphone, a tablet computing device, etc.), a portable or stationary computing device (e.g., a personal desktop or laptop computer, etc.), an IoT device (e.g., a sensor device, a smart appliance, a smart automobile, etc.), an intelligent home system controller, a handheld or wearable device (e.g., a smart watch, a fitness tracker, etc.), a robotic system or device, or any other system or device as may serve a particular implementation.

As shown, UE device 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation. Each of facilities 102 and 104 within UE device 100 will now be described in more detail.

Storage facility 102 may store and/or otherwise maintain executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with discovering and employing distributed computing resources in a manner that accounts for performance priorities and a preferred way in which the performance priorities are to be balanced (e.g., according to user preferences that may be manually selected or built into an application executing on UE device 100). To this end, processing facility 104 may be configured to provide a service request to an orchestration system that is communicatively coupled with UE device 100. The orchestration system may be associated, for instance, with a federation of compute clusters that are also each communicatively coupled with UE device 100 and that are each available to fulfill the service request in different ways (e.g., by balancing performance priorities in different ways).

Along with providing the service request to the orchestration system, processing facility 104 may also identify a service optimization policy for the service request. For example, the service optimization policy may be associated with a user preference for balancing a plurality of performance priorities during fulfillment of the service request. As will be described in more detail below, the user preference may be manifested in any suitable way such as by direct user input of a priority balancing preference or by a more indirect selection by the user of a particular application configured to be executed by processing facility 104 in a manner that balances the plurality of performance priorities in a certain way. The plurality of performance priorities may include priorities such as minimizing latencies (e.g., transport latencies to communicate between UE device 100 and a compute cluster, compute latencies for the compute cluster to fulfill the service request, etc.), maximizing resource efficiencies (e.g., using less costly computing resources, etc.), and so forth.

In response to the service request, processing facility 104 may receive cluster selection data from the orchestration system. The cluster selection data may be representative of (e.g., may include a selection of, may include data related to, etc.) a subset of compute clusters from the federation of compute clusters. For example, the subset of compute clusters may include a relatively small number of compute clusters (out of a relatively large number of compute clusters included in the federation) that the orchestration system determines may be likely to serve UE device 100 well in accordance with various potential ways of balancing the plurality of performance priorities. For example, if the performance priorities include minimizing latencies and maximizing resource efficiencies, the subset of compute clusters represented in the cluster selection data may include certain compute clusters that are likely to perform with very low latencies for UE device 100, certain compute clusters that are likely to perform with very high resource efficiency, and other compute clusters that may balance these performance priorities in different ways and/or to different degrees.

Based on the cluster selection data, processing facility 104 may characterize each of the compute clusters in the subset with respect to the plurality of performance priorities. For instance, referring to the exemplary performance priorities of minimizing latencies and maximizing resource efficiencies, processing facility 104 may characterize each compute cluster in the subset by determining what the total latency (e.g., the transport latency plus the compute latency) is for each compute cluster, and by determining what the resource efficiency (e.g., the overall resource usage tradeoffs, monetary costs, etc.) is for each compute cluster. Then, based on the characterization of each of the compute clusters in the subset and further based on the service optimization policy that has been identified, processing facility 104 may select a compute cluster from the subset to fulfill the service request (e.g., a compute cluster that most optimally balances the performance priorities in accordance with the service optimization policy). It will be understood that, in certain examples, processing facility 104 may further account for additional factors in selecting the compute cluster to fulfill the service request. For example, in addition to considering the characterization of the compute clusters and the service optimization policy, processing facility 104 may be configured to select a compute cluster in accordance with one or more rules or limitations associated with a service agreement, a subscription plan restriction, or the like. In other examples, the orchestration system may account for such considerations and may thus only include options in the cluster selection data for compute clusters that UE device 100 is authorized to use under all applicable rules and limitations. Once the compute cluster is selected, processing facility 104 may provide an orchestration request indicative of this selected compute cluster to the orchestration system. The orchestration request may serve to request the orchestration system to orchestrate the fulfillment of the service request by the selected compute cluster.

In some examples, UE device 100 may be configured to operate in real time so as to provide, receive, process, and/or use the messages and data described above (e.g., service requests, service optimization policies, cluster selection data, etc.) immediately as the data is generated or otherwise becomes available. As a result, UE device 100 may discover and employ distributed computing resources in a manner that customizes the balancing of performance priorities immediately after being requested to do so and based on timely, real-time data. As used herein, operations may be performed in "real time" when they are performed immediately and without undue delay. In some examples, real-time data processing operations may be performed in relation to data that is highly dynamic and time sensitive (i.e., data that becomes irrelevant after a very short time). As such, real-time operations may discover and employ distributed computing resources while the data upon which the compute cluster selections are made continues to be relevant and up-to-date.

The methods described herein for discovering and employing distributed computing resources to balance performance priorities may be performed, implemented, or used by implementations of UE device 100 configured for use in a variety of different types of use cases. To provide just a few non-limiting examples, implementations of UE device 100 may be deployed on a 5G, real-time enterprise ("RTE") network (or any other suitable provider network in which MEC technology is deployed) to enable: 1) extended reality applications (e.g., augmented or virtual reality applications, etc.); 2) autonomous robotics applications (e.g., robotics applications employing cameras and a variety of sensors, etc.); 3) indoor navigation applications that use sensors and/or computer vision to navigate; 4) accessibility applications; 5) emergency response applications; 6) connected home (e.g., home automation) applications; 7) smart cities applications; 8) autonomous vehicles applications; 9) financial services applications; 10) manufacturing applications (e.g., manufacturing applications that employ sensors, manufacturing standards compliance, autonomously guided vehicles, robots, etc.); 11) IoT applications (e.g., in which hundreds, thousands, or more devices may communicate and cooperate with one another); 12) retail solutions (e.g., cashier-less checkout, automated inventory, planogram compliance using computer vision, etc.); 13) content delivery applications; 14) machine learning applications; and/or any other suitable applications as may serve a particular implementation.

Regardless of the use case or application for which a particular implementation of UE device 100 is used, an important function that UE device 100 may perform is to discover available distributed computing resources and to employ certain such resources (e.g., rather than other such resources) in a way that balances performance priorities in a customizable and desirable way. To illustrate the types of computing resources that may be employed to balance performance priorities in customizable ways, FIG. 2 shows an exemplary network architecture 200 within which UE device 100 may be deployed.

Figure 2:
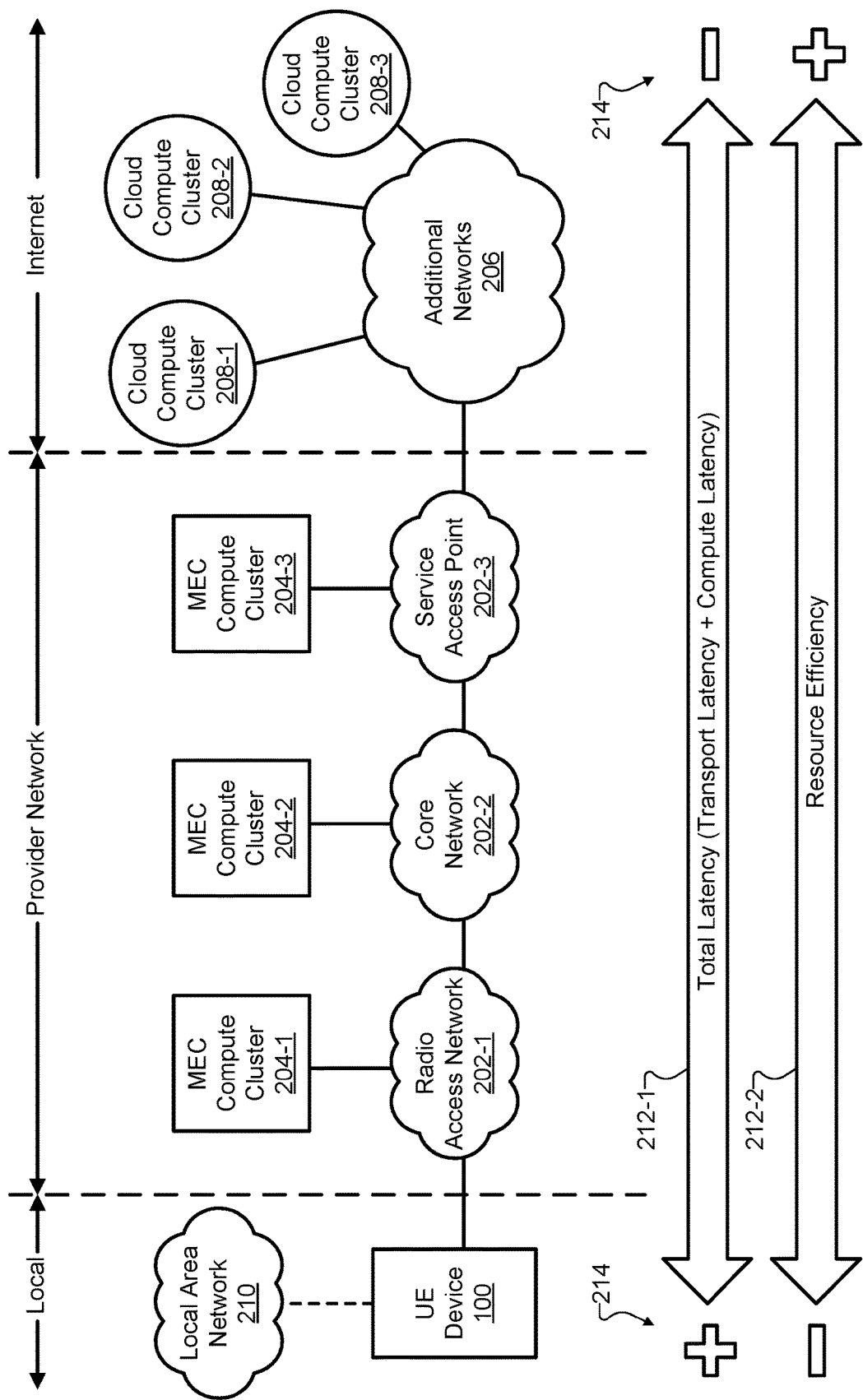
FIG. 2 illustrates an exemplary network architecture within which the UE device of FIG. 1 may be deployed according to embodiments described herein.

As shown in FIG. 2, network architecture 200 is divided into three domains of communication that each may include zero or more communication networks. More specifically, the UE device 100 is included in a local domain of communication ("Local") and is configured to communicate with systems and devices (e.g., compute clusters) included within both a provider network communication domain ("Provider Network") and an Internet communication domain ("Internet").

The provider network may be implemented as a provider-specific wired or wireless communications network (e.g., a cellular network used for mobile phone and data communications, a 5G network or network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of the provider network may own or control all of the elements necessary to deliver communications services to users of devices such as UE device 100, including radio spectrum allocation, wireless network infrastructure, back haul infrastructure, customer care, provisioning of devices, and so forth.

As shown, the provider network may include or consist of various network resources 202 (e.g., network resources 202-1 through 202-3) each providing respective MEC compute clusters 204 (e.g., MEC compute cluster 204-1 through 204-3). For example, as shown, one or more radio access network ("RAN") resources 202-1 may directly communicate with UE device 100 and may provide access to integrated MEC compute cluster 204-1; core network resources 202-2 may communicate with UE device 100 indirectly (e.g., by way of RAN resources 202-1) and may provide access to integrated MEC compute cluster 204-2; service access point ("SAP") network resources 202-3 may communicate with UE device 100 indirectly (e.g., by way of RAN resources 202-1 and core resources 202-2) and may provide access to integrated MEC compute cluster 204-3; and other network resources (not explicitly shown) may similarly help provide communication services for UE device 100 and/or may provide access to integrated MEC compute clusters as may serve a particular implementation.

As used herein, a "compute cluster" may refer to any set of computing resources (e.g., a server, a blade server, an edge server, a set of servers at a single site, etc.) that is accessible to a UE device by way of one or more networks (e.g., the provider network, the provider network and the Internet, etc.) and is available to perform distributed computing tasks (e.g., to fulfill service requests provided by UE devices such as UE device 100). A given compute cluster may include a set of co-located computing resources (e.g., processors, CPUs, GPUs, etc.), memory and communication resources, etc.) such that the computing resources all communicate with a particular UE device with a similar transport latency and such that the compute cluster may be treated as a single, discrete entity for the purposes of distributed computing resource selection by the UE device. As will be described in more detail below, MEC compute clusters may be integrated within the provider network and may, thus, be distinguishable from cloud compute clusters, which are generally external to the provider network and accessed by way of networks beyond the provider network (e.g., the Internet).

MEC compute clusters 204 may be integrated on the provider network in various ways or in connection with various different network resources of the provider network, as shown. While there may be differences between MEC compute clusters integrated with different network resources (e.g., MEC compute cluster 204-1 may have a shorter transport latency to UE device 100 than MEC compute cluster 204-3, while MEC compute cluster 204-3 may include a greater wealth of computing resources than MEC compute cluster 204-1), all of MEC compute clusters 204 may have certain commonalities when compared to computing resources in other communication domains (e.g., local communication resources, cloud compute clusters, etc.). For example, in an embodiment, MEC compute clusters may generally be more efficient to scale than local computing resources, while being less efficient to scale than cloud computing resources. This efficiency of scalability is a consequence of how many different client devices may utilize or leverage a computing resources cluster at once. For more localized computing resources (e.g., MEC compute cluster 204-1, 204-2, etc.), only a small number of UE devices may leverage the computing resources, thereby requiring deployment of significant hardware and maintenance of resources at many local sites in order to serve a large number of UE devices. In contrast, computing resources that are more centralized (e.g., MEC compute cluster 204-3, cloud compute clusters described below, etc.) may be shared by relatively large numbers of UE devices, thereby requiring a less hardware per resource to deploy and maintain resources at fewer centralized sites to serve the same large number of UE devices.

As another exemplary feature shared by MEC compute clusters 204, the transport latencies of all of MEC compute clusters 204 may be significantly lower than respective transport latencies of cloud compute clusters. It will be understood that MEC compute clusters may be associated with varying transport latencies based on their proximity to UE device 100 (e.g., from a few milliseconds for more localized compute clusters such as MEC compute cluster 204-1 to about a dozen milliseconds for more centralized compute clusters such as MEC compute cluster 204-3). However, these transport latencies may all be significantly less than transport latencies to cloud compute clusters requiring communications beyond the provider network.

By way of the provider network, FIG. 2 shows that UE device 100 may also be communicatively coupled with one or more additional networks 206 that are external to the provider network (e.g., on the Internet, as labeled in FIG. 2). As shown, a plurality of cloud compute clusters 208 (e.g., cloud compute clusters 208-1 through 208-3) may be connected to these additional networks 206. For example, cloud compute clusters may include compute clusters operated by large cloud computing enterprises such as VERIZON (e.g., VERIZON Cloud), AMAZON (e.g., AMAZON Web Services ("AWS")), MICROSOFT (e.g., MICROSOFT Azure), GOOGLE (e.g., GOOGLE Cloud Platform ("GCP")), ORACLE (ORACLE Cloud), or the like.

Additional networks 206 may include any interconnected network infrastructure that is external to the provider network and outside of the control of the provider. For example, additional networks 206 may include the Internet, a wide area network, a content delivery network, and/or any other suitable network or networks managed by any third parties outside of the control of the mobile network operator providing the provider network. As such, communication with cloud computing clusters 208 may be performed by way of the provider network and the Internet, rather than (as with communication with MEC compute clusters 204) just by way of the provider network. For this reason, significant additional transport latency (e.g., several tens of milliseconds, hundreds of milliseconds, etc.) may be associated with employing cloud compute clusters 208 as compared to the transport latencies achieved with communications to MEC compute clusters 204 by way of the provider network only. By the same token, however, cloud compute clusters 208 may have higher resource efficiencies when compared with MEC compute clusters 204. This may be because cloud compute clusters 208 may be very centralized and efficient to scale, even while being potentially much less proximate to UE devices that are being served.

As illustrated in network architecture 200, MEC compute clusters 204 and cloud compute clusters 208 may be implemented as part of the provider network or the Internet, respectively, and, hence, may be physically separated in space from UE device 100 and/or other client systems. As a result, these networks may provide data delivery between server-side provider systems (e.g., compute clusters and/or other provider systems not explicitly shown) and client-side systems and devices (e.g., UE devices such as UE device 100). To this end, the provider network and the Internet may implement or employ any suitable communication technologies, devices, media, protocols, or the like as may serve a particular implementation.

In some examples, it will be understood that a combination of distributed computing resources (as well as on-board resources integrated into UE device 100 itself) may be employed for various applications and use cases. For example, certain computing tasks may require relatively low latency that can only be provided by MEC resources while other computing tasks may benefit from the high resource efficiency and/or low cost of being performed by cloud computing resources. Accordingly, it will be understood that a service request provided by UE device 100 may relate to a single computing task, and that, in certain examples, a single UE device or application executing on the UE device may provide multiple service requests that may ultimately be fulfilled by different compute clusters.

Additionally, network architecture 200 further depicts a local area network ("LAN") 210 that may be communicatively coupled to and configured to serve UE device 100 within a local area in certain examples. In such examples, UE device 100 may access LAN 210 by way of a Wi-Fi connection or the like, and may use LAN 210, in addition or as an alternative to the provider network, as a gateway to access the Internet. In certain examples, computing resources associated with LAN 210 (not explicitly shown) may also be configured to fulfill service requests for UE device 100. Such resources may offer even lower transport latencies than MEC compute clusters 204, but may also be less efficient to scale, as well as being associated with other risks that do not affect distributed computing on the provider network or in the cloud (i.e., the Internet). For example, computing resources associated with LAN 210 may only be accessible when UE device 100 is in a very particular place (e.g., at a particular work site, in a particular room, etc.), may represent a single point of failure, and so forth. Additionally, the low transport latency may be somewhat offset by a higher compute latency in cases where it is prohibitively inefficient to outfit a local computing system with similar computing resources (e.g., parallel graphics processing units, etc.) as might be common in a MEC compute cluster or cloud compute cluster. Accordingly, LAN 210 may provide access to certain computing clusters in certain situations.

As mentioned above, when UE device 100 has a computing task that is to be performed by way of distributed computing, UE device 100 may be configured to discover and employ distributed computing resources in a way that optimally balances performance priorities (i.e., that balances performance priorities in a customized way according to user preferences as described herein). As shown in FIG. 2, in certain examples, a plurality of performance priorities 212 (e.g., performance priorities 212-1 and 212-2) may include a first performance priority 212-1 defined as a total latency that is to be minimized and a second performance priority 212-2 defined as a resource efficiency that is to be maximized.

As indicated in FIG. 2, the total latency of performance priority 212-1 may be defined as a sum of a transport latency and a compute latency. For example, for a given compute cluster, the total latency may be determined by adding the transport latency between UE device 100 and the given compute cluster (e.g., one of MEC compute clusters 204 or cloud compute clusters 208) and the compute latency associated with the given compute cluster (i.e., the amount of time it takes for the selected MEC compute cluster 204 or cloud compute cluster 208 to perform the task). It will be understood that performance priority 212-1 may further incorporate or be implemented by other characteristics (e.g., benefits, advantages, etc.) of MEC compute clusters other than latency-related characteristics. For example, along with providing lower latency than cloud compute clusters, MEC compute clusters may also be advantageous over cloud compute clusters for their ability to improve network bandwidth by removing network traffic from a data backbone connection between the provider network and the Internet. As another example, MEC compute clusters may also provide significant privacy benefits when compared with cloud compute clusters because provider networks may provide higher levels of security than the Internet in general, and certain security-related processing may be reduced or avoided if data is to stay on the provider network and not be exposed to the Internet. Any of these or other benefits may in incorporated into performance priority 212-1, although, for exemplary purposes, performance priority 212-1 is only shown to represent total latency in FIG. 2.

In contrast, the resource efficiency of performance priority 212-2 may relate to various types of economic and resource costs and tradeoffs associated with employing a particular compute cluster over another. For example, if all else is equal (e.g., if both a MEC compute cluster 204 and a cloud compute cluster 208 are capable of fulfilling a service request with a suitable latency, bandwidth, QoS), it may desirable to use a centralized and highly resource efficient cloud compute cluster 208, rather than a localized MEC compute cluster 204. This is, in part, because MEC resources (especially highly localized MEC resources such as those in MEC compute cluster 204-1 associated with RAN resources 202-1) are not as readily available and/or deployable as similarly powerful cloud compute resources, and thus are most efficiently used only when the actual need for a given application exists. For these reasons, resource efficiency for MEC compute clusters 204 is generally lower than resource efficiency for cloud compute clusters 208. This efficiency may be represented by a variety of different types of resource efficiency metrics or indices such as a resource cost index, a monetary cost metric (e.g., a price to use the compute cluster), or any other suitable metric or index representative of the resource efficiency. It will be understood that, while price (e.g., monetary cost) is used herein in certain examples to represent resource efficiency, the magnitude of any price may be inversely proportional to the resource efficiency (i.e., the higher the resource efficiency, the lower the price) and these prices may be replaced by other types of resource efficiency metrics as may serve a particular implementation.

Plus ('+') and minus ('−') symbols 214 next to performance priorities 212 indicate which side of the respective spectra of performance priorities 212 is generally considered to be ideal or optimal, and which is considered to be non-ideal or sub-optimal. Specifically, as shown by the plus symbol 214 on the left side of latency priority 212-1 (and as has been described), more localized computing resources are generally associated with more ideal or optimal latencies (i.e., lower latencies). However, as shown by the minus symbol 214 on the left side of resource efficiency priority 212-2, these same localized computing resources are also generally associated with less ideal, suboptimal resource efficiencies. Conversely, as shown by the minus symbol 214 on the right side of latency priority 212-1, more centralized computing resources are generally associated with less ideal (e.g., higher) latencies, while, as shown by the plus symbol 214 on the right side of resource efficiency priority 212-2, these same centralized computing resources are also generally associated with more ideal and optimal resource efficiencies. Accordingly, because performance priorities 212 generally compete with one another (i.e., because compute clusters that best serve one performance priority tend to poorly serve the other performance priority), any compute cluster selected by UE device 100 to fulfill a service request may balance performance priorities 212 in a particular way.

By employing methods and devices described herein, this balancing of performance priorities 212 that is inherently performed in any compute cluster selection may be deliberately performed in a manner that accounts for user preference and system efficiencies. For example, as mentioned above, different circumstances (e.g., different users, different applications, different times and conditions under which the users are executing the applications, etc.) may call for different ways of balancing performance priorities 212 when selecting a distributed computing resource to fulfill a service request. As such, UE device 100 may identify or be identified with a dynamic (e.g., updatable, changing, etc.) or static service optimization policy associated with a user preference for balancing performance priorities 212 during fulfillment of a particular service request under a given set of (static or dynamic) circumstances.

To illustrate, FIGS. 3A through 3D depict respective representations of several examples of different service optimization policies 300 (e.g., service optimization policies 300-A in FIG. 3A, 300-B in FIG. 3B, 300-C in FIG. 3C, and 300-D in FIG. 3D) associated with different user preferences for balancing performance priorities 212. Similar to FIG. 2, each of FIGS. 3A through 3D depicts performance priorities 212-1 ("Total Latency") and 212-2 ("Resource Efficiency") together with plus and minus symbols indicating how these priorities may conflict with one another (i.e., to achieve an optimal total latency ('+') on the left-hand side of the spectra requires a suboptimal resource efficiency ('−'), while to achieve an optimal resource efficiency ('+') on the right-hand side of the spectra requires a suboptimal total latency ('−')).

Figure 3A:
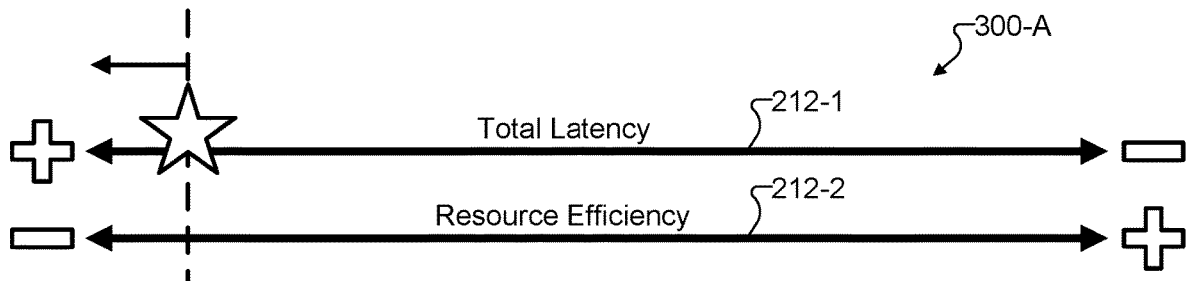
FIGS. 3A through 3D illustrate different service optimization policies associated with different user preferences for balancing performance priorities according to embodiments described herein.

Service optimization policy 300-A in FIG. 3A illustrates an exemplary service optimization policy indicating that the user preference for balancing the plurality of performance priorities is to minimize the total latency (i.e., performance priority 212-1) without regard for the resource efficiency (i.e., performance priority 212-2). Specifically, as illustrated by a star object drawn on the total latency spectrum and an arrow pointing toward the optimal side of the total latency spectrum (i.e., to the left), service optimization policy 300-A corresponds to a policy to entirely prioritize latency above resource efficiency (i.e., to achieve the shortest latency possible regardless of how costly the computing resources are to achieve this). As one example where such a service optimization policy may be appropriate, a professional or expert video game player is considered. For this type of user, the difference of a few milliseconds in latency may make a significant difference in the gaming performance that the user can achieve, while resource efficiency (e.g., cost of playing the game with low latency) may be a very secondary consideration. More generally, any application that involves real-time interaction between different users (e.g., extended reality or gaming applications in which users may talk to one another, work together to perform game tasks, on-line live gambling, etc.) may be most enjoyed when total latency is very low such that lag and delay (e.g., in communication, in actions performed, etc.) are not easily perceived.

Figure 3B:
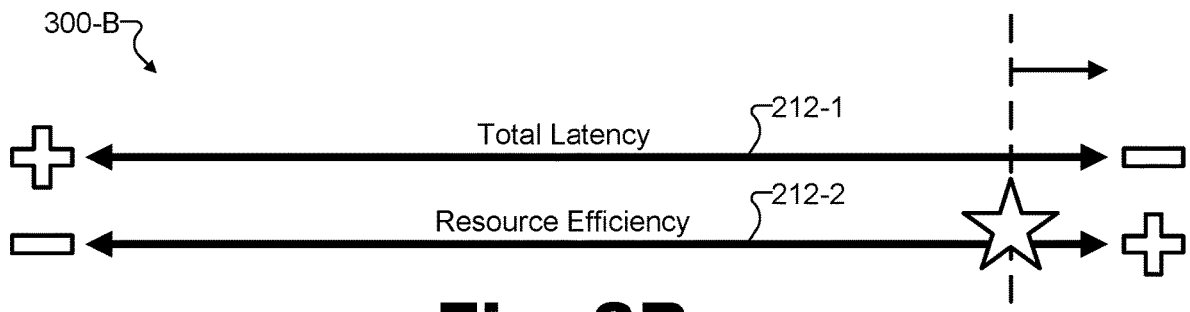

In contrast, service optimization policy 300-B in FIG. 3B illustrates an exemplary service optimization policy indicating that the user preference for balancing the plurality of performance priorities is to maximize the resource efficiency (i.e., performance priority 212-2) without regard for latency (i.e., performance priority 212-1). Specifically, as illustrated by a star object drawn on the resource efficiency spectrum and an arrow pointing toward the optimal side of the resource efficiency spectrum (i.e., to the right), service optimization policy 300-B corresponds to a policy to entirely prioritize resource efficiency above latency (i.e., to achieve the best resource efficiency possible, such as may be reflected by the lowest possible cost, regardless of how much latency is imposed in order to achieve this). As one example where such a service optimization policy may be appropriate, an application for performing data analytics is considered. For a user concerned with this type of data-intensive, but non-real-time, task, a relatively large amount of latency may be tolerable if it helps to maximize resource usage (i.e., keep the resource efficiency high). As another example, an application related to a training process for machine learning may require significant processing resources but not necessarily low latency, and may thus be associated with a policy like service optimization policy 300-B.

Figure 3C:
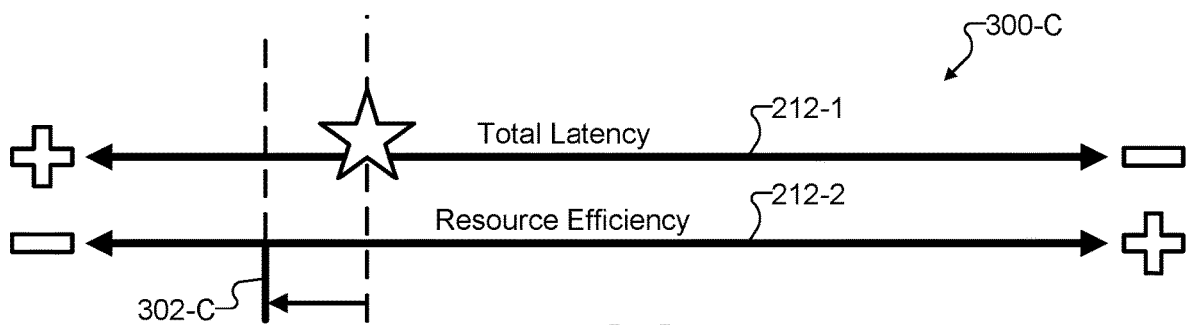

As another example, service optimization policy 300-C in FIG. 3C illustrates an exemplary service optimization policy indicating that the user preference for balancing the plurality of performance priorities is to minimize the total latency (i.e., performance priority 212-1) while still maintaining a predetermined minimum resource efficiency (i.e., performance priority 212-2). Specifically, as illustrated by a star object drawn on the total latency spectrum and an arrow pointing toward the optimal side of the total latency spectrum (i.e., to the left) until reaching a minimum resource efficiency 302-C, service optimization policy 300-C corresponds to a policy to prioritize total latency above resource efficiency up to a point, but to still guarantee that at least a threshold level of resource efficiency is met. According to this policy, resources offering more optimal latency will be selected only if they can also offer a degree of resource efficiency no lower than a degree represented by minimum resource efficiency 302-C (e.g., only if the resources cost less than a threshold maximum cost). As one example where such a service optimization policy may be appropriate, a video game player is considered who is enthusiastic, but more casual than the professional player described above. For this type of user, total latency may be important and decreasing the latency may indeed improve the user's gaming experience, but an upper threshold of cost (i.e., a minimum resource efficiency) may also be very important to the user. Accordingly, service optimization policy 300-C may allow the user to essentially "set his or her own limits" (or resource efficiency requirement) and then to achieve the best latency performance possible based on those limits.

Figure 3D:
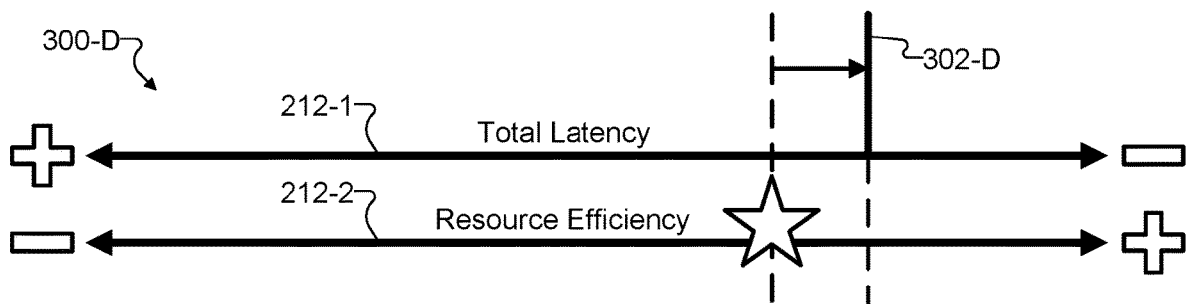

As yet another example, service optimization policy 300-D in FIG. 3D illustrates an exemplary service optimization policy indicating that the user preference for balancing the plurality of performance priorities is to maximize the resource efficiency (i.e., performance priority 212-2) while still maintaining a predetermined maximum total latency (i.e., performance priority 212-1). Specifically, as illustrated by a star object drawn on the resource efficiency spectrum and an arrow pointing toward the optimal side of the resource efficiency spectrum (i.e., to the right) until reaching a maximum total latency 302-D, service optimization policy 300-D corresponds to a policy to prioritize resource efficiency above total latency up to a point, but to still guarantee that at least a threshold level of total latency is met. According to this policy, resources offering better resource efficiency (e.g., lower cost) will be selected only if the resources can also perform with no more than a maximum total latency represented by maximum total latency 302-D. As one example where such a service optimization policy may be appropriate, a user experiencing an extended reality world (e.g., a virtual reality world, etc.) is considered. If certain real-time aspects of the extended reality world (e.g., video processing, sound processing, user interaction, etc.) are processed by a distributed computing resource, a total latency may need to meet a certain maximum threshold before distracting lag can be perceived by the user. However, as long as this threshold is met, no additional benefit may be perceived by the user regardless of how much lower the latency may be. Accordingly, for this type of user, it may be desirable to set a maximum allowable latency, but then to maximize resource efficiency (e.g., thereby minimizing resource usage costs) as much as possible thereafter. Because different users perceive lag with different sensitivities, the maximum threshold of latency may be customizable from user to user or from situation to situation.

UE device 100 may identify any of these service optimization policies or other suitable service optimization policies in any suitable way. For instance, in certain examples, a user interface element may directly allow a user to input desired parameters representative of how the user wishes to balance performance priorities for a certain application or even for a certain session using a particular application. Parameters associated with high priorities, low priorities, maximum costs (e.g., associated with minimum resource efficiency 302-C), maximum latencies (e.g., associated with maximum total latency 302-D), and so forth may all be input directly by a user according to that user's preference in certain implementations.

In other implementations, the user preference may be determined indirectly, and an appropriate service optimization policy may be identified (e.g., defined, set, etc.) in an automated manner. For instance, referring to the video gaming examples above, the professional or expert gamer may purchase a premium version of a video game that implements service optimization policy 300-A, while the more casual gamer may purchase a standard version of the video game that implements service optimization policy 300-C. Alternatively, both players may purchase the same version of the video game, but the professional player may purchase an add-on to the game that enables the lower latency of service optimization policy 300-A, while the casual player may decline to pay for this add-on. UE device 100 may identify the service optimization policy associated with the user preference in these examples based on which version of the video game the user is selecting to play (e.g., or whether the add-on is installed, etc.). In other examples, trial or demo versions of an application may set different service optimization policies than full, paid versions; certain achievements earned or paid for (e.g., by game currency, by watching advertisements, etc.) within an application may "unlock" different service optimization policies; and so forth as may serve a particular implementation.

In certain implementations, service optimization policies associated with user preferences may change dynamically from session to session (e.g., each time a user executes an application, etc.) or even from moment to moment based on the context of the application. In other implementations, service optimization policies may be relatively static and associated with the application itself, conditions when the application begins executing or when a service request is sent, or the like. As mentioned above, UE device 100 may be configured, in certain implementations, to account for various rules and limitations (e.g., rules and/or limitations associated with a particular service plan or quality of service to which the user of UE device 100 is subscribed) as the UE device selects distributed computing resources to balance performance priorities. In some examples, UE device 100 may be configured to account for these rules itself independently from the service optimization policy. In other examples, however, such rules and limitations may be incorporated into the service optimization policy, may be incorporated into parameters dictated by a particular application executing on the UE device, may be imposed by the orchestration system (e.g., by only including compute clusters that the UE device 100 is authorized to use in the subset of compute clusters represented in the cluster selection data), or may be imposed in any other suitable way.

To discover and employ distributed computing resources in a manner that balances performance priorities in accordance with user preferences as described above, UE device 100 may be configured to interoperate with an orchestration system that has insight into and/or control over various compute clusters that could each potentially be employed to fulfill service requests for UE device 100 in accordance with different types of service optimization policies.

To illustrate, FIG. 4 shows an exemplary configuration 400 within which several exemplary implementations of UE device 100 may operate. As shown, configuration 400 includes a plurality of UE devices each implementing UE device 100 and labeled as UE devices 100-1 through 100-3. As further shown, these UE devices 100 are all communicatively coupled to an orchestration system 402 that is associated with a federation 404 of compute clusters (e.g., MEC compute clusters 204, cloud compute clusters 208, etc.).

Each implementation of UE device 100 may take any of the forms or be implemented in any of the ways described above in relation to FIG. 1, and, as such, may be configured to perform any of the operations described herein. As shown, each UE device 100 may be associated with (e.g., used by, controlled by, etc.) a respective user 406 (e.g., user 406-1 associated with UE device 100-1, user 406-2 associated with UE device 100-2, etc.). As described above, different users 406 may have different needs and goals that may correspond to different performance priorities and different service optimization policies.

Each UE device 100 may be communicatively coupled to orchestration system 402 directly (e.g., by way of a direct wireless connection), indirectly (e.g., by way of other networks or network components not shown in FIG. 4), or in any other suitable way. While three UE devices 100 are shown in configuration 400 for exemplary purposes, it will be understood that any suitable number of UE devices 100 may be present in a given configuration. For example, hundreds or thousands or more UE devices 100 that are all connected to a provider network (e.g., a nationwide provider network) and are of various different types described herein may all be directly and/or indirectly connected to a single orchestration system (or to a relatively small number of cooperating orchestration systems) such as orchestration system 402.

Orchestration system 402 may be a computing system configured to interoperate with UE devices 100 to perform any of the operations described herein that facilitate or enable the discovery and employing of distributed computing resources to balance performance priorities. For example, orchestration system 402 may operate as a "master server" or "master compute cluster" that interfaces with UE devices 100 on behalf of various compute clusters in federation 404 of compute clusters. As such, orchestration system 402 may be configured to track and maintain data representative of computing capabilities, physical locations, current computing loads, and/or other data corresponding to the compute clusters in federation 404 so as be able to facilitate orchestration of optimally customized compute clusters for particular service requests of UE devices 100.

Orchestration system 402 may be implemented by any suitable compute cluster on a network (e.g., a provider network). For example, a compute cluster configured to operate as orchestration system 402 may be a dedicated compute cluster configured only or primarily to perform orchestration services described herein, or may be a compute cluster that is also available for fulfilling service requests for UE devices 100 (e.g., one of MEC compute clusters 204 or cloud compute clusters 208). In some examples, orchestration system 402 may be deployed in a centralized location for the area that it is to serve. In certain implementations, orchestration system 402 may be distributed between multiple computers and/or locations, while, in other implementations, orchestration system 402 may be implemented by a single compute cluster or server.

As shown, federation 404 may include various compute clusters of various types and/or from various networks (e.g., the provider network, the Internet, a local area network, etc.) For example, as shown in configuration 400, federation 404 may include MEC compute clusters 204 and cloud compute clusters 208 that were described above in relation to FIG. 2. It will also be understood that other MEC compute clusters, other cloud compute clusters, and/or other types of compute clusters not explicitly shown may further be included within federation 404 to be represented and orchestrated, by orchestration system 402, to fulfill service requests for UE devices 100.

To illustrate the interoperation of a particular UE device 100 with an orchestration system such as orchestration system 402 to discover and employ distributed computing resources to balance performance priorities according to principles described herein, a specific and extended example will now be provided in connection with FIGS. 5-9.

Figure 5:
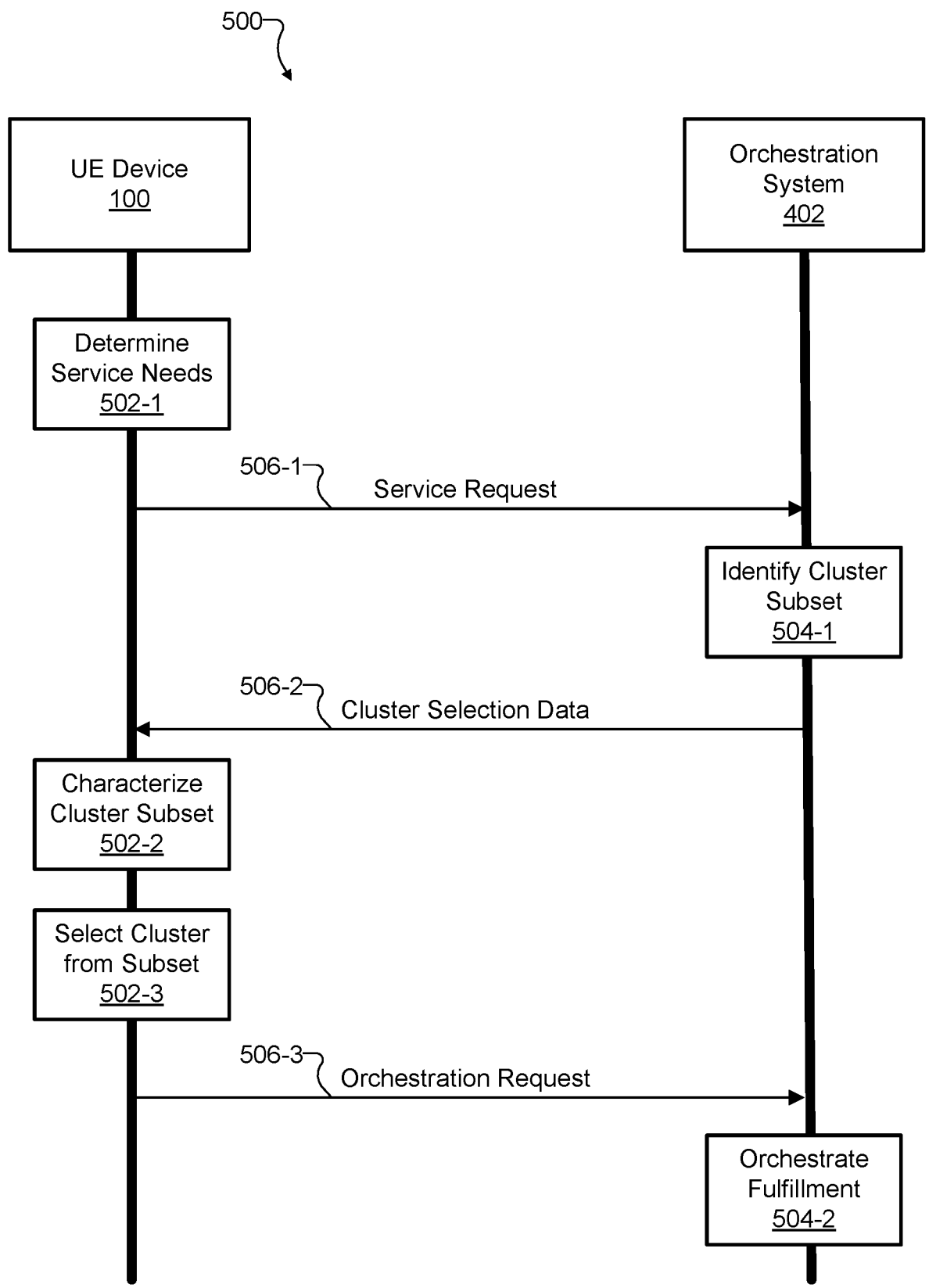
FIG. 5 illustrates an exemplary performance of operations and communications between the UE device of FIG. 1 and the orchestration system of FIG. 4 to discover and employ distributed computing resources to balance performance priorities according to embodiments described herein.

FIG. 5 shows an exemplary performance 500 of various operations and communications between an exemplary implementation of UE device 100 and orchestration system 402 to discover and employ distributed computing resources in a manner that balances performance priorities in accordance with user preference.

Specifically, as time moves forward from the top of FIG. 5 to the bottom of FIG. 5, the left side of FIG. 5 shows certain operations 502 (e.g., operations 502-1 through 502-3) that are performed by UE device 100 while the right side of FIG. 5 shows certain operations 504 (e.g., operations 504-1 and 504-2) that are performed by orchestration system 402. Additionally, and in connection with operations 502 and/or 504, performance 500 shows various communications 506 (e.g., communications 506-1 through 506-3) between UE device 100 and orchestration system 402 to enable and facilitate operations 502 and/or 504. In this way, performance 500 may progress until a particular service request of UE device 100 is fulfilled by a particular compute cluster that balances performance priorities of a user 406 of UE device 100 (not shown in FIG. 5). Each of operations 502, operations 504, and communications 506 will now be described in more detail.

At operation 502-1, UE device 100 may be configured to determine that a computing task is to be performed by way of distributed computing ("Determine Service Needs"), and, as a result, may generate and provide a service request to orchestration system 402. In certain implementations, identifying the need for and generating the service request may essentially be the extent of what UE device 100 is configured to do in operation 502-1. In other implementations that will be described in more detail below, however, operation 502-1 may further include selecting (e.g., prior to the providing of the service request to orchestration system 402) a subset of resource combinations from a set of resource combinations provided by compute clusters in federation 404. For example, the resource combinations in the selected subset may each be deemed to be a suitable resource combination for fulfilling the service request, and the service request may therefore be generated to indicate the subset of suitable resource combinations for fulfilling the service request. Resource combination and selecting suitable subsets of resource combinations will be described in more detail below.

Operation 502-1 may result in the transmission of the service request from UE device 100 to orchestration system 402 as communication 506-1. The service request of communication 506-1 may include a request for orchestration system 402 to help UE device 100 discover and set up communication with a suitable compute cluster to perform any computing task or set of computing tasks as may serve a particular implementation (e.g., a one-time individual task, a continuous task to be performed continuously as long as the application is executing, etc.). Such tasks may relate to any of the applications or use cases described herein.

At operation 504-1, in response to the service request communicated in communication 506-1, orchestration system 402 identifies a subset of suitable compute clusters from all of the compute clusters in federation 404, and generates and provides (back to UE device 100) cluster selection data representative of the selected subset of compute clusters.

The compute clusters selected for the subset represented in the cluster selection data may be chosen by orchestration system 402 based on data tracked or maintained by orchestration system 402. For example, this data used to select the subset may be indicative of user preferences and characteristics, physical locations of UE device 100 and/or particular compute clusters in federation 404, a data plan or subscription details associated with a particular user or application executing on UE device 100, and/or any other factors as may serve a particular implementation. The compute clusters selected for the subset may also be chosen to provide a variety of different ways of balancing performance priorities 212 (e.g., options that would fall on various different places along the spectra of performance priorities 212). For instance, in certain examples, the selected subset of compute clusters may include both 1) a MEC compute cluster 204 integrated within the provider network to which UE device 100 is directly connected, and 2) a cloud compute cluster 208 external to the provider network and communicatively coupled with UE device 100 by way of the provider network and an additional network distinct from the provider network (e.g., the Internet).

Operation 504-1 may result in the transmission of the cluster selection data from orchestration system 402 to UE device 100 as communication 506-2. The cluster selection data of communication 506-2 may include a listing of the selected subset of compute clusters, as well as various information for each compute cluster in the selected subset of compute clusters.

To illustrate, FIG. 6 illustrates exemplary cluster selection data 600 for the extended example being described in connection with FIGS. 5-9. As shown, cluster selection data 600 includes a subset of compute clusters that has been selected by orchestration system 402 (e.g., as part of operation 504-1 described above) to include a first MEC compute cluster ("MEC-1"), a second MEC compute cluster ("MEC-2"), and a cloud compute cluster ("Cloud-1"). These selected compute clusters will be understood to correspond to any suitable compute clusters described herein. For instance, the MEC-1 compute cluster may correspond to MEC compute cluster 204-1, the MEC-2 compute cluster may correspond to MEC compute cluster 204-2, and the Cloud-1 compute cluster may correspond to cloud compute cluster 208-1, or the like.

As shown, each of the selected compute clusters in the subset (i.e., MEC-1, MEC-2, and Cloud-1) may be associated with a respective Internet protocol ("IP") address that may also be represented within cluster selection data 600 (i.e., "192.168.1.100" for MEC-1, "192.168.1.200" for MEC-2, and "23.45.67.89" for Cloud-1). Additionally, each of the compute clusters may be associated with a plurality of different resource combinations, each of which is represented on a different row of the table shown in FIG. 6.

As used herein, a "resource combination" may refer to any set or combination of computing resources that may be offered by a particular compute cluster. For example, a given compute cluster may include a large wealth of computing resources including, for example, central processing units ("CPUs"), volatile and non-volatile memory resources, graphics processing units ("GPUs"), tensor processing units ("TPUs"), neural processing units ("NPUs"), and various other computing resources as may serve a particular implementation. Different service requests may require or be most efficiently fulfilled using different types of computing resources and/or computing resources that exhibit particular relationships (e.g., a certain amount of memory per CPU, a certain number of GPUs per CPU, etc.). Accordingly, different resource combinations may be offered by different compute clusters at different costs to provide computing resources that can be scaled and customized to different types of distributed computing tasks. It will be understood that computing resources described herein may include physical computing resources (e.g., physical CPUs, etc.) or virtual computing resources (e.g., virtual CPUs, etc.).

Cluster selection data 600 shows a few exemplary resource combinations (i.e., "small-none," "medium-none," "large-none," "small-small," "medium-small," "large-small," "small-large," "medium-large," and "large-large") that are named to suggest the number of CPU and GPU resources that are associated with each resource combination. The specific number or amount of computing resources are shown in FIG. 6 for each resource combination under columns labeled "#CPUs," "Memory," and "#GPUs." For example, the "small-none" resource combination includes 2 CPUs, 8 gigabytes ("GB") of volatile memory, and no GPUs, while the "large-large" resource combination, in contrast, includes 8 CPUs, 32 GB of volatile memory, and 4096 GPUs. While only a few possible resource combinations and only a few categories of resources are illustrated in cluster selection data 600 for the sake of illustration, it will be understood that certain implementations may support a much larger number of possible resource combinations including iterations and permutations of these and/or other computing resources described herein (e.g., TPUs, NPUs, non-volatile storage resources, etc.).

As shown in FIG. 6, each resource combination for each compute cluster may be associated with a particular resource efficiency metric. As mentioned above, the resource efficiency metric may be any suitable metric or index or other value that represents (e.g., either proportionally or inversely proportionally) how resource efficient each particular compute cluster is. For convenience of illustration, FIG. 6 illustrates an inversely proportional resource efficiency metric implemented as a monetary cost value or price. Specifically, for example, cluster selection data 600 includes, for the MEC-1 compute cluster, a first resource efficiency metric for a first resource combination provided by the MEC-1 compute cluster (i.e., a price of $0.60 for the "small-none" resource combination), a second resource efficiency metric for a second resource combination provided by the MEC-1 compute cluster (i.e., a price of $1.20 for the "medium-none" resource combination), and so forth. Cluster selection data 600 illustrates the point described above that compute clusters associated with relatively low (optimal) latency (e.g., such as the MEC-1 compute cluster) are generally less resource efficient, and therefore more highly priced, than are compute clusters associated with relatively high (suboptimal) latency (e.g., such as the Cloud-1 compute cluster). For example, for the "medium-small" resource combination that includes 4 CPUs, 16 GB of memory, and 256 GPUs, cluster selection data 600 shows that it may cost $2.40 (e.g., per hour, per task, etc.) for the low-latency MEC-1 compute cluster to fulfill the service request, $1.20 for the higher latency MEC-2 compute cluster to fulfill the service request, and $0.40 for the relatively high latency Cloud-1 compute cluster to fulfill the service request.

As mentioned above in relation to operation 502-1, in certain implementations, the service request provided by UE device 100 may indicate only that UE device 100 requires a distributed computing task to be performed, while, in other implementations, the service request may indicate a particular subset of suitable resource combinations for fulfilling the service request. Based on how much information was included in the service request, the amount of data included in cluster selection data 600 may vary significantly. For example, if no selected subset of resource combinations is indicated in the service request, cluster selection data 600 may include all of the possible resource combinations offered by the selected subset of compute clusters (a listing which, as mentioned above, may include a relatively large number of resource combinations). Such a listing is illustrated in cluster selection data 600, although, as mentioned, certain listings may actually include many more entries than are shown in FIG. 6.

Conversely, if a selected subset of resource combination is indicated in the service request, cluster selection data 600 may include data (e.g., efficiency metric data such as the pricing data shown) corresponding to only resource combinations of the subset of compute clusters that are included in the subset of suitable resource combinations. As a result, significantly less cluster selection data may be transferred in such examples. For instance, rather than all nine of the resource combinations shown in FIG. 6, an implementation of cluster selection data 600 might only include data for the "small-none" resource combination, the "medium-small" resource combination, and the "large-large" resource combination.

Returning to FIG. 5, regardless of whether the cluster selection data transmitted in communication 506-2 includes data for all of the resource combinations or just a selected subset of resource combinations, UE device 100 may perform operation 502-2 ("Characterize Cluster Subset") to identify all the information needed to select a compute cluster and a resource combination offered by the compute cluster to satisfy the service request in accordance with a service optimization policy. For example, if cluster selection data 600 transmitted in communication 506-2 includes all of the potential resource combinations offered by the selected subset of compute clusters, part of operation 502-2 may be to select, based on the received cluster selection data 600 and from the overall set of resource combinations (e.g., the nine resource combinations included in cluster selection data 600 as shown in FIG. 6), a subset of suitable resource combinations for fulfilling the service request. Operation 502-1 may then further include characterizing of each of the compute clusters in the subset of compute clusters by characterizing each of the compute clusters only for resource combinations included in the subset of suitable resource combinations.

In contrast, if cluster selection data 600 already includes only the subset of suitable resource combinations due to the suitable resource combinations being selected and indicated as part of the service request (e.g., as part of operation 502-1, as described above), operation 502-2 may be performed by simply characterizing of each of the compute clusters in the subset of compute clusters for the resource combinations included in the subset of suitable resource combinations. In either case, the selected subset of suitable resource combinations for the selected subset of compute clusters may be characterized in operation 502-2 so as to gather information such as is illustrated in FIGS. 7A and 7B.

FIG. 7A shows exemplary transport latency data 702 for UE device 100 with respect to each compute cluster in the selected subset of compute clusters. Specifically, as shown, transport latency data 702 indicates that the MEC-1 compute cluster has only a 5 ms transport latency from UE device 100, the MEC-2 compute cluster has a 9 ms transport latency from UE device 100, and the Cloud-1 compute cluster has a 47 ms transport latency from UE device 100. The transport latencies shown in transport latency data 702 may be characterized (i.e., determined by UE device 100) in any suitable way. For example, the characterizing of UE device 100 in operation 502-2 may be accomplished by performing a ping operation (e.g., utilizing the ping utility of the Internet Control Message Protocol ("ICMP"), the traceroute utility of the User Datagram Protocol ("UDP"), etc.) to measure the transport latency between UE device 100 and each of the selected compute clusters.

FIG. 7B shows exemplary compute latency data 704 for UE device 100 with respect to each of the resource combinations in the selected subset of suitable resource combinations (i.e., "small-none," "medium-small," and "large-large"). Specifically, as shown, compute latency data 704 indicates that, regardless of which compute cluster is selected, the "small-none" resource combination (including, as shown, 2 CPUs, 8 GB of memory, and no GPU resources) may be expected to perform a particular computing task with approximately 10 ms of compute latency. The "medium-small" resource combination (including, as shown, 4 CPUs, 16 GB of memory, and 256 GPUs) may be expected to perform the same particular computing task with approximately 6 ms of compute latency, and the "large-large" resource combination (including, as shown, 8 CPUs, 32 GB of memory, and 4096 GPUs) may be expected to perform the same particular computing task with only approximately 3 ms of compute latency. The compute latencies shown in FIG. 7B may be determined in any suitable way as part of operation 502-2. For example, these compute latencies may be estimated in a manner that accounts for how parallelizable the computing task is, how long the computing task has been measured to take in other instances, what resources the computing task requires or could make use of, and so forth. In some examples, the estimated compute latency may be a theoretical estimate only, while, in other examples, the estimated compute latency may be based on measurements of similar computing tasks being performed under similar circumstances (e.g., using similar resource combinations, etc.).

Once transport latency data 702 is measured and compute latency data 704 is estimated, this data may be summed to determine the total latency for each particular resource combination of each particular compute cluster in the selected subsets. Additionally, respective resource metrics representative of resource efficiencies for each resource combination and/or compute cluster in the subsets may be accessed and combined with the summed data representative of the total latency.

To illustrate, FIG. 8 shows all of the exemplary characterization data that has been collected, accessed, calculated, and/or otherwise characterized for each of the compute clusters in the selected subset of compute clusters and for each of the resource combinations in the selected subset of suitable resource combinations. Specifically, FIG. 8 illustrates characterization data 800 that includes both a total latency ("Latency") representative of performance priority 212-1 and a resource efficiency metric ("Efficiency") representative of performance priority 212-2 for each of the MEC-1, MEC-2, and Cloud-1 compute clusters and for each of the "small-none," "medium-small," and "large-large" resource combinations in the selected subsets.

Returning to FIG. 5, UE device 100 may use characterization data 800 determined in operation 502-2 to make the final selection of an optimal compute cluster and resource combination in operation 502-3 ("Select Cluster from Subset"). Specifically, accounting for a service optimization policy that UE device 100 has identified for the present service request, UE device 100 may determine which compute cluster and resource combination is most optimized to the preferences of the user 406 controlling UE device 100. For example, UE device 100 may make this determination by minimizing a resource cost function defined by the service optimization policy (e.g., a resource cost function that prioritizes latency without regard for resource efficiency, prioritizes resource efficiency without regard for latency, prioritizes latency with resource efficiency as an upper limit, prioritizes resource efficiency with latency as an upper limit, etc.).

As one example (corresponding to service optimization policy 300-A), if the service optimization policy indicates that the user preference for balancing performance priorities 212 is to minimize the total latency without regard for the resource efficiency, UE device 100 may select, based on characterization data 800, the MEC-1 compute cluster with the "large-large" resource combination, since this would result in the lowest total latency (8 ms) and the user is not concerned that this combination also has the lowest resource efficiency (i.e., the highest monetary efficiency metric of $9.60).

As another example (corresponding to service optimization policy 300-B), if the service optimization policy indicates that the user preference for balancing performance priorities 212 is to maximize the resource efficiency without regard for the total latency, UE device 100 may select, based on characterization data 800, the Cloud-1 compute cluster with the "small-none" resource combination, since this would result in the greatest resource efficiency (i.e., the lowest monetary efficiency metric of $0.10) and the user is not concerned that this combination also has the highest total latency (57 ms).

As yet another example (corresponding to service optimization policy 300-C), if the service optimization policy indicates that the user preference for balancing performance priorities 212 is to minimize the total latency while maintaining a predetermined minimum resource efficiency (e.g., so as to not let the monetary efficiency metric exceed $1.00/hour), UE device 100 may select, based on characterization data 800, the MEC-1 compute cluster with the "small-none" resource combination, since this would result in the lowest total latency (15 ms) of all the options with a resource efficiency that is high enough to satisfy a threshold or other criteria (e.g., to keep the monetary efficiency metric from exceeding $1.00/hour).

As still another example (corresponding to service optimization policy 300-D), if the service optimization policy indicates that the user preference for balancing performance priorities 212 is to maximize the resource efficiency while maintaining a predetermined maximum total latency of 20 ms, UE device 100 may select, based on characterization data 800, the MEC-2 compute cluster with the "small-none" resource combination, since this would result in the greatest resource efficiency (i.e., the lowest monetary efficiency metric of $0.30) of all the options with a total latency less than 20 ms.

Once a particular compute cluster (and, in some examples, resource combination) has been selected, operation 502-3 may also include the generating, by UE device 100, of an orchestration request that is communicated to orchestration system 402 by way of communication 506-3. The orchestration request may indicate to orchestration system 402 which compute cluster and/or resource combination UE device 100 has selected to fulfill the service request, and, as such, may request orchestration system 402 to orchestrate the selected compute cluster to fulfill the service request.

Accordingly, in operation 504-2, orchestration system 402 may be configured to send messages or perform other suitable operations associated with orchestrating the fulfillment of the service request of UE device 100 by the selected compute cluster ("Orchestrate Fulfillment"). For example, in certain implementations, orchestration system 402 may transmit a message to the selected compute cluster within federation 404 to indicate that the compute cluster has been assigned to fulfill the service request that will be received from UE device 100. In other implementations, orchestration system 402 may transmit a message to UE device 100 indicating the contact information for the selected compute cluster (e.g., the IP address, etc.) to allow UE device 100 to communicate directly with the selected compute cluster to accomplish the computing tasks associated with the service request.

Figure 9:
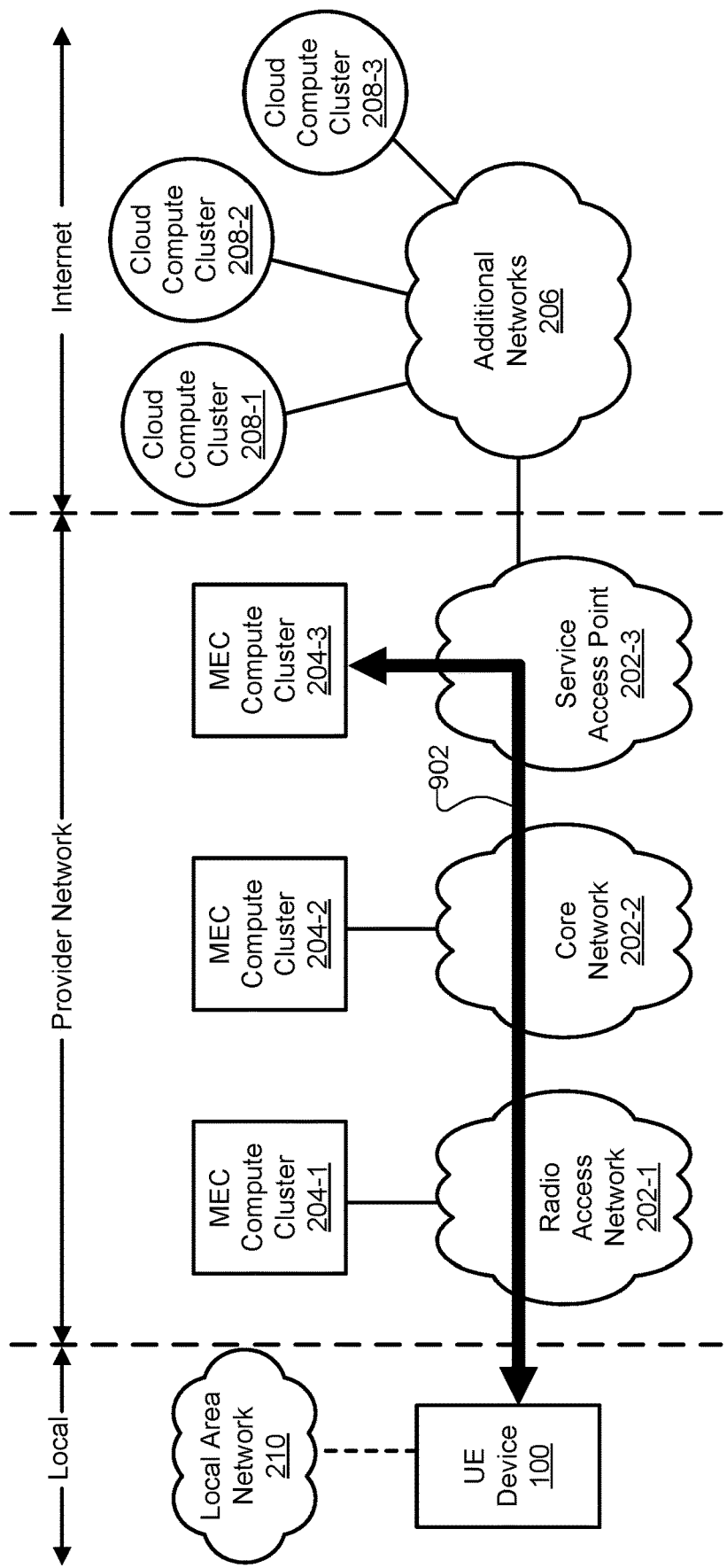
FIG. 9 illustrates an exemplary communication link that has been orchestrated to fulfill a service request made by an implementation of the UE device of FIG. 1 according to embodiments described herein.

To illustrate, FIG. 9 shows an exemplary communication link 902 that has been orchestrated to fulfill the service request made by UE device 100 against the backdrop of the network architecture illustrated in FIG. 2. Specifically, as shown, in an example where UE device 100 has selected, and orchestration system 402 has orchestrated, MEC compute cluster 204-3 to fulfill the service request, UE device 100 may communicate with MEC compute cluster 204-3 by way of communication link 902 to employ the distributed computing resources of MEC compute cluster 204-3 and thereby optimally balance the performance priorities preferred by the user of UE device 100.

Figure 10:
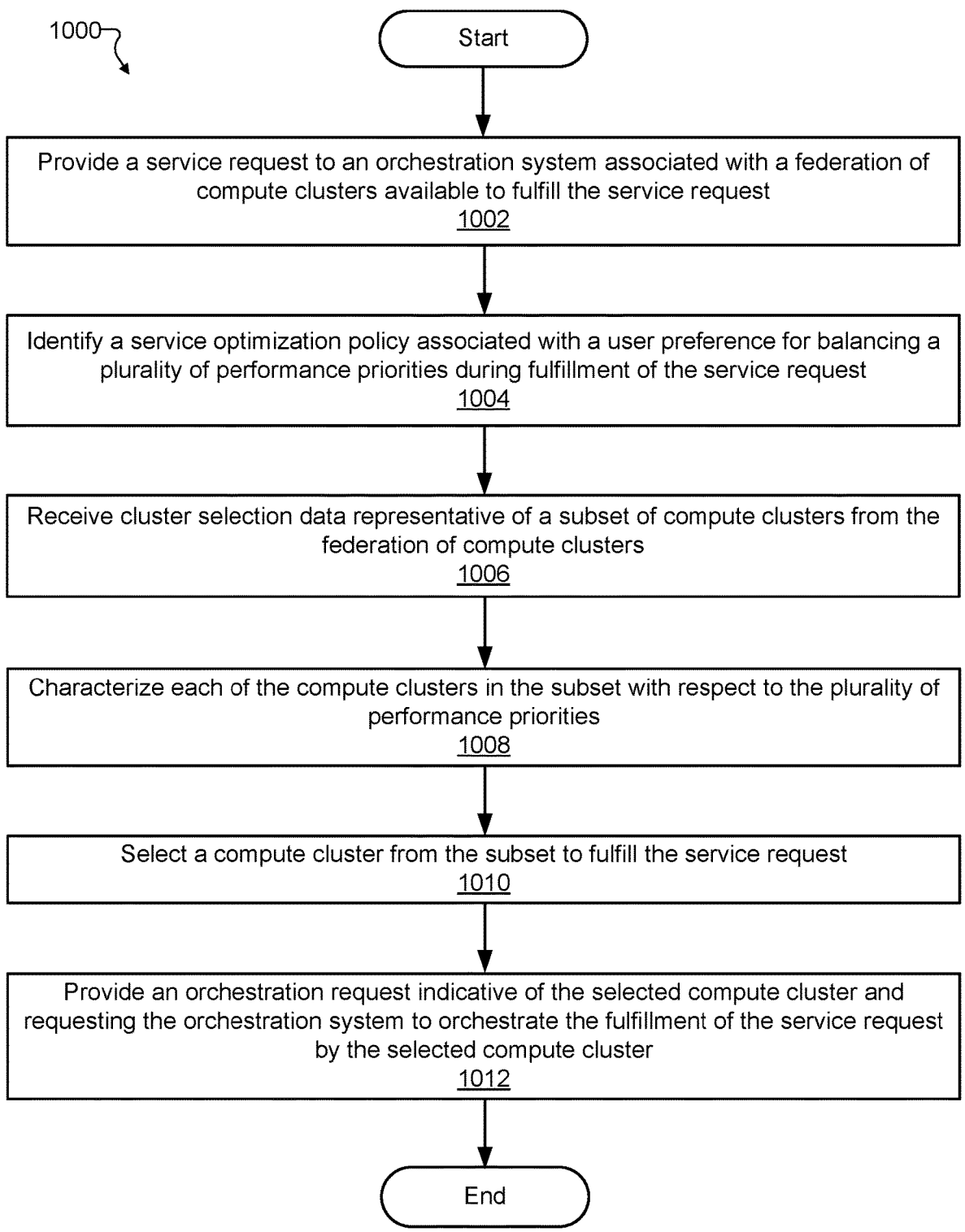
FIGS. 10 and 11 illustrate exemplary methods for discovering and employing distributed computing resources to balance performance priorities according to embodiments described herein.

FIG. 10 illustrates an exemplary method 1000 for discovering and employing distributed computing resources to balance performance priorities. While FIG. 10 illustrates exemplary operations according to one embodiment, other embodiments may omit, add to, reorder, and/or modify any of the operations shown in FIG. 10. One or more of the operations shown in FIG. 10 may be performed by UE device 100, any components included therein, and/or any implementation thereof.

In operation 1002, a UE device may provide a service request to an orchestration system. For example, the orchestration system may be associated with a federation of compute clusters that are each communicatively coupled with the UE device and available to fulfill the service request. Operation 1002 may be performed in any of the ways described herein.

In operation 1004, the UE device may identify a service optimization policy for the service request. In some examples, the service optimization policy may be associated with a user preference for balancing a plurality of performance priorities during fulfillment of the service request. Operation 1004 may be performed in any of the ways described herein.

In operation 1006, the UE device may receive cluster selection data from the orchestration system. The cluster selection data may be representative of a subset of compute clusters from the federation of compute clusters. In some examples, the UE device may receive the cluster selection data from the orchestration system in response to the service request provided in operation 1002. Operation 1006 may be performed in any of the ways described herein.

In operation 1008, the UE device may characterize each of the compute clusters in the subset of compute clusters with respect to the plurality of performance priorities. For instance, the UE device may characterize the compute clusters in the subset based on the cluster selection data. Operation 1008 may be performed in any of the ways described herein.

In operation 1010, the UE device may select a compute cluster to fulfill the service request provided in operation 1002. For example, the UE device may select the compute cluster from the subset of compute clusters represented in the cluster selection data received in operation 1006. In some examples, the UE device may select the compute cluster based on the service optimization policy identified in operation 1004 and/or based on the characterization of each of the compute clusters in operation 1008. Operation 1010 may be performed in any of the ways described herein.

In operation 1012, the UE device may provide an orchestration request to the orchestration system. For instance, the orchestration request may be indicative of the compute cluster selected in operation 1010, and may serve to request the orchestration system to orchestrate the fulfillment of the service request by the selected compute cluster. Operation 1012 may be performed in any of the ways described herein.

Figure 11:
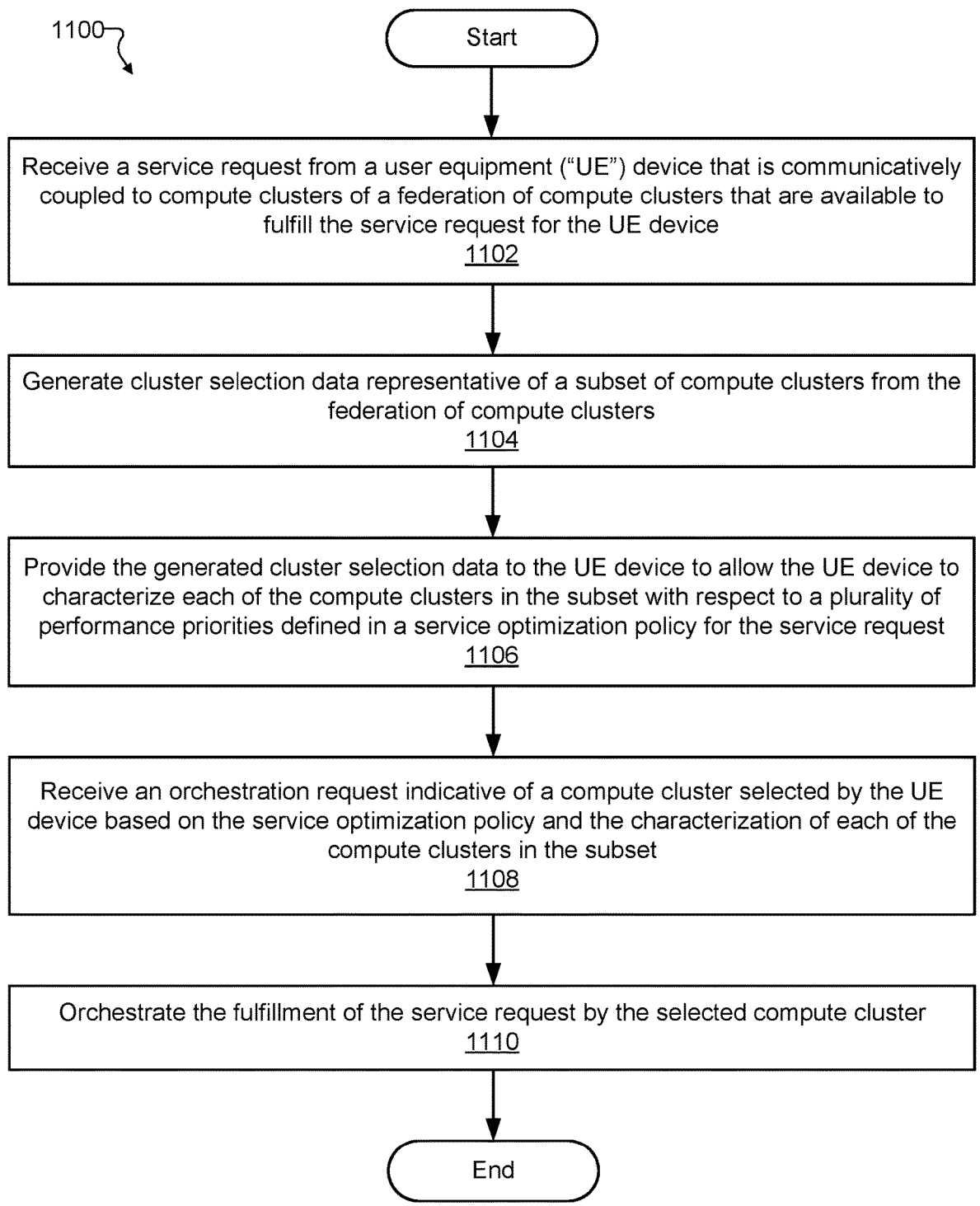

FIG. 11 illustrates an exemplary method 1100 for discovering and employing distributed computing resources to balance performance priorities. While FIG. 11 illustrates exemplary operations according to one embodiment, other embodiments may omit, add to, reorder, and/or modify any of the operations shown in FIG. 11. One or more of the operations shown in FIG. 11 may be performed by any of the orchestration systems described herein, such as orchestration system 402, any components included therein, and/or any implementation thereof.

In operation 1102, an orchestration system associated with a federation of compute clusters may receive a service request from a UE device. For example, the UE device may be communicatively coupled to various compute clusters of the federation that are available to fulfill the service request for the UE device. Operation 1102 may be performed in any of the ways described herein.

In operation 1104, the orchestration system may generate cluster selection data in response to the service request received in operation 1102. In some examples, the cluster selection data may be representative of a subset of compute clusters from the federation of compute clusters. Operation 1104 may be performed in any of the ways described herein.

In operation 1106, the orchestration system may provide the cluster selection data generated in operation 1104 to the UE device. In this way, the orchestration system may facilitate or otherwise enable or allow the UE device to characterize, based on the cluster selection data, each of the compute clusters in the subset with respect to a plurality of performance priorities defined in a service optimization policy for the service request. Operation 1106 may be performed in any of the ways described herein.

In operation 1108, the orchestration system may receive an orchestration request from the UE device. In some examples, the orchestration request may be indicative of a compute cluster selected by the UE device based on the service optimization policy and the characterization of each of the compute clusters in the subset based on the cluster selection data provided in operation 1106. Operation 1108 may be performed in any of the ways described herein.

In operation 1110, the orchestration system may orchestrate the fulfillment of the service request by the selected compute cluster. The orchestration system may perform this orchestration in response to the orchestration request received in operation 1108 and based on the selected compute cluster indicated in that orchestration request. Operation 1110 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
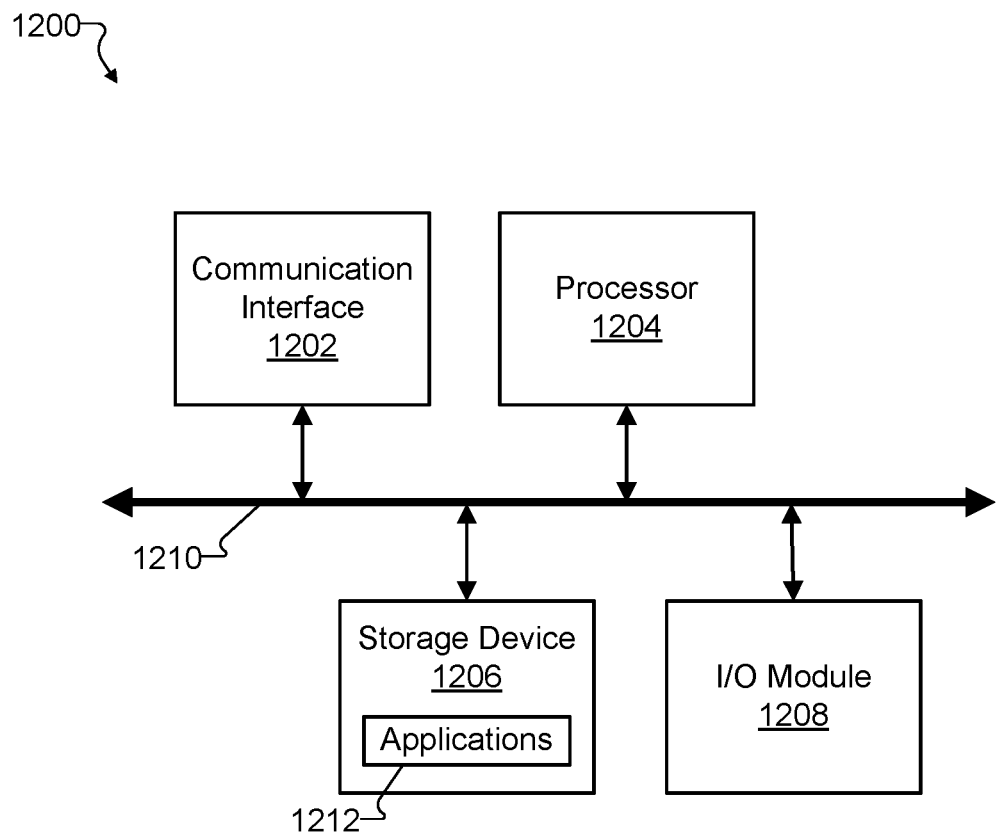
FIG. 12 illustrates an exemplary computing device according to embodiments described herein.

FIG. 12 illustrates an exemplary computing device 1200 that may be specifically configured to perform one or more of the processes described herein. For example, computing device 1200 may implement a device such as UE device 100, a system such as orchestration system 402, or any other computing devices described herein (e.g., any of compute clusters 206 or 208, etc.).

As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with processing facility 104 of UE device 100. Likewise, storage facility 102 of UE device 100 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by an orchestration system to a user equipment (UE) device communicatively coupled to a federation of compute clusters, cluster selection data for a subset of compute clusters from the federation of compute clusters, the cluster selection data configured to facilitate the UE device in characterizing the compute clusters of the subset with respect to a service optimization policy;
receiving, by the orchestration system from the UE device, an orchestration request indicative of a compute cluster selected by the UE device based on the characterizing of the compute clusters of the subset; and
orchestrating, by the orchestration system in response to the orchestration request, fulfillment of a service request to be performed by the selected compute cluster for the UE device.

2. The method of claim 1, further comprising receiving, by the orchestration system from the UE device, the service request as a request for performance of one or more distributed computing tasks to be performed by a compute cluster that is to be selected by the UE device;
wherein:
the providing of the cluster selection data is performed in response to the receiving of the service request;
the service optimization policy is associated with the service request and defines a user preference for balancing a plurality of performance priorities during the fulfillment of the service request; and
the selected compute cluster is selected by the UE device based on the service optimization policy.

3. The method of claim 1, wherein the subset of compute clusters from the federation of compute clusters includes:
a multi-access edge computing ("MEC") compute cluster integrated within a provider network to which the UE device is directly connected, the MEC compute cluster communicatively coupled with the UE device by way of the provider network; and
a cloud compute cluster external to the provider network and communicatively coupled with the UE device by way of the provider network and an additional network distinct from the provider network.

4. The method of claim 1, wherein the cluster selection data includes, for each particular compute cluster in the subset of compute clusters:
a first resource efficiency metric for a first resource combination provided by the particular compute cluster; and
a second resource efficiency metric for a second resource combination provided by the particular compute cluster.

5. The method of claim 1, wherein the cluster selection data:
includes data representative of a set of resource combinations offered by compute clusters in the federation of compute clusters; and
is configured to facilitate the UE device in:
selecting, from the set of resource combinations, a subset of suitable resource combinations for fulfilling the service request, and
characterizing the compute clusters in the federation of compute clusters for the resource combinations included in the selected subset of suitable resource combinations.

6. The method of claim 1, further comprising receiving, by the orchestration system from the UE device, an indication of a subset of suitable resource combinations selected by the UE device from a set of resource combinations offered by compute clusters in the federation of compute clusters;
wherein the cluster selection data includes data corresponding to compute clusters that offer resource combinations included in the subset of suitable resource combinations.

7. The method of claim 1, wherein:
the selected compute cluster is selected by the UE device based on the service optimization policy;
the service optimization policy defines a user preference for balancing a plurality of performance priorities during the fulfillment of the service request; and
the plurality of performance priorities includes a resource efficiency that is to be maximized and a total latency that is to be minimized.

8. The method of claim 7, wherein the service optimization policy defines the user preference for balancing the plurality of performance priorities as one of:
a preference for minimizing the total latency without regard for the resource efficiency;
a preference for maximizing the resource efficiency without regard for the total latency;
a preference for minimizing the total latency while maintaining a predetermined minimum resource efficiency; or
a preference for maximizing the resource efficiency while maintaining a predetermined maximum total latency.

9. A system comprising:
a memory storing instructions; and
a processor communicatively coupled to the memory and configured to execute the instructions to:
provide, to a user equipment (UE) device communicatively coupled to a federation of compute clusters, cluster selection data for a subset of compute clusters from the federation of compute clusters, the cluster selection data configured to facilitate the UE device in characterizing the compute clusters of the subset with respect to a service optimization policy;
receive, from the UE device, an orchestration request indicative of a compute cluster selected by the UE device based on the characterizing of the compute clusters of the subset; and
orchestrate, in response to the orchestration request, fulfillment of a service request to be performed by the selected compute cluster for the UE device.

10. The system of claim 9, wherein:
the processor is further configured to execute the instructions to receive, from the UE device, the service request as a request for performance of one or more distributed computing tasks to be performed by a compute cluster that is to be selected by the UE device;
the providing of the cluster selection data is performed in response to the receiving of the service request;
the service optimization policy is associated with the service request and defines a user preference for balancing a plurality of performance priorities during the fulfillment of the service request; and
the selected compute cluster is selected by the UE device based on the service optimization policy.

11. The system of claim 9, wherein the subset of compute clusters from the federation of compute clusters includes:
a multi-access edge computing ("MEC") compute cluster integrated within a provider network to which the UE device is directly connected, the MEC compute cluster communicatively coupled with the UE device by way of the provider network; and
a cloud compute cluster external to the provider network and communicatively coupled with the UE device by way of the provider network and an additional network distinct from the provider network.

12. The system of claim 9, wherein the cluster selection data includes, for each particular compute cluster in the subset of compute clusters:
a first resource efficiency metric for a first resource combination provided by the particular compute cluster; and
a second resource efficiency metric for a second resource combination provided by the particular compute cluster.

13. The system of claim 9, wherein the cluster selection data:
includes data representative of a set of resource combinations offered by compute clusters in the federation of compute clusters; and
is configured to facilitate the UE device in:
selecting, from the set of resource combinations, a subset of suitable resource combinations for fulfilling the service request, and
characterizing the compute clusters in the federation of compute clusters for the resource combinations included in the selected subset of suitable resource combinations.

14. The system of claim 9, wherein:
the processor is further configured to execute the instructions to receive, from the UE device, an indication of a subset of suitable resource combinations selected by the UE device from a set of resource combinations offered by compute clusters in the federation of compute clusters;
the cluster selection data includes data corresponding to compute clusters that offer resource combinations included in the subset of suitable resource combinations.

15. The system of claim 9, wherein:
the selected compute cluster is selected by the UE device based on the service optimization policy;
the service optimization policy defines a user preference for balancing a plurality of performance priorities during the fulfillment of the service request; and
the plurality of performance priorities includes a resource efficiency that is to be maximized and a total latency that is to be minimized.

16. The system of claim 15, wherein the service optimization policy defines the user preference for balancing the plurality of performance priorities as one of:

a preference for minimizing the total latency without regard for the resource efficiency;

a preference for maximizing the resource efficiency without regard for the total latency;

a preference for minimizing the total latency while maintaining a predetermined minimum resource efficiency; or a preference for maximizing the resource efficiency while maintaining a predetermined maximum total latency.

17. A method comprising:

receiving, by a user equipment (UE) device from an orchestration system, cluster selection data for a subset of compute clusters from a federation of compute clusters to which the UE device is communicatively coupled;

characterizing, by the UE device based on the cluster selection data, each of the compute clusters in the subset with respect to a service optimization policy;

selecting, by the UE device based on the characterization of each of the compute clusters in the subset, a compute cluster from the subset to fulfill a service request; and providing, by the UE device to the orchestration system, an orchestration request indicative of the selected compute cluster and requesting the orchestration system to orchestrate a fulfillment of the service request by the selected compute cluster.

18. The method of claim 17, wherein:

the selecting of the compute cluster is performed based on the service optimization policy;

the service optimization policy defines a user preference for balancing a plurality of performance priorities during the fulfillment of the service request; and the plurality of performance priorities includes a resource efficiency that is to be maximized and a total latency that is to be minimized.

19. The method of claim 18, wherein the service optimization policy defines the user preference for balancing the plurality of performance priorities as one of:

a preference for minimizing the total latency without regard for the resource efficiency;

a preference for maximizing the resource efficiency without regard for the total latency;

a preference for minimizing the total latency while maintaining a predetermined minimum resource efficiency; or a preference for maximizing the resource efficiency while maintaining a predetermined maximum total latency.

20. The method of claim 17, embodied as computer-executable instructions on at least one non-transitory computer-readable medium.

* * * * *